May 24, 1966 — H. E. MILLER — 3,252,667
CENTRIFUGAL CHUCK
Filed Dec. 23, 1963
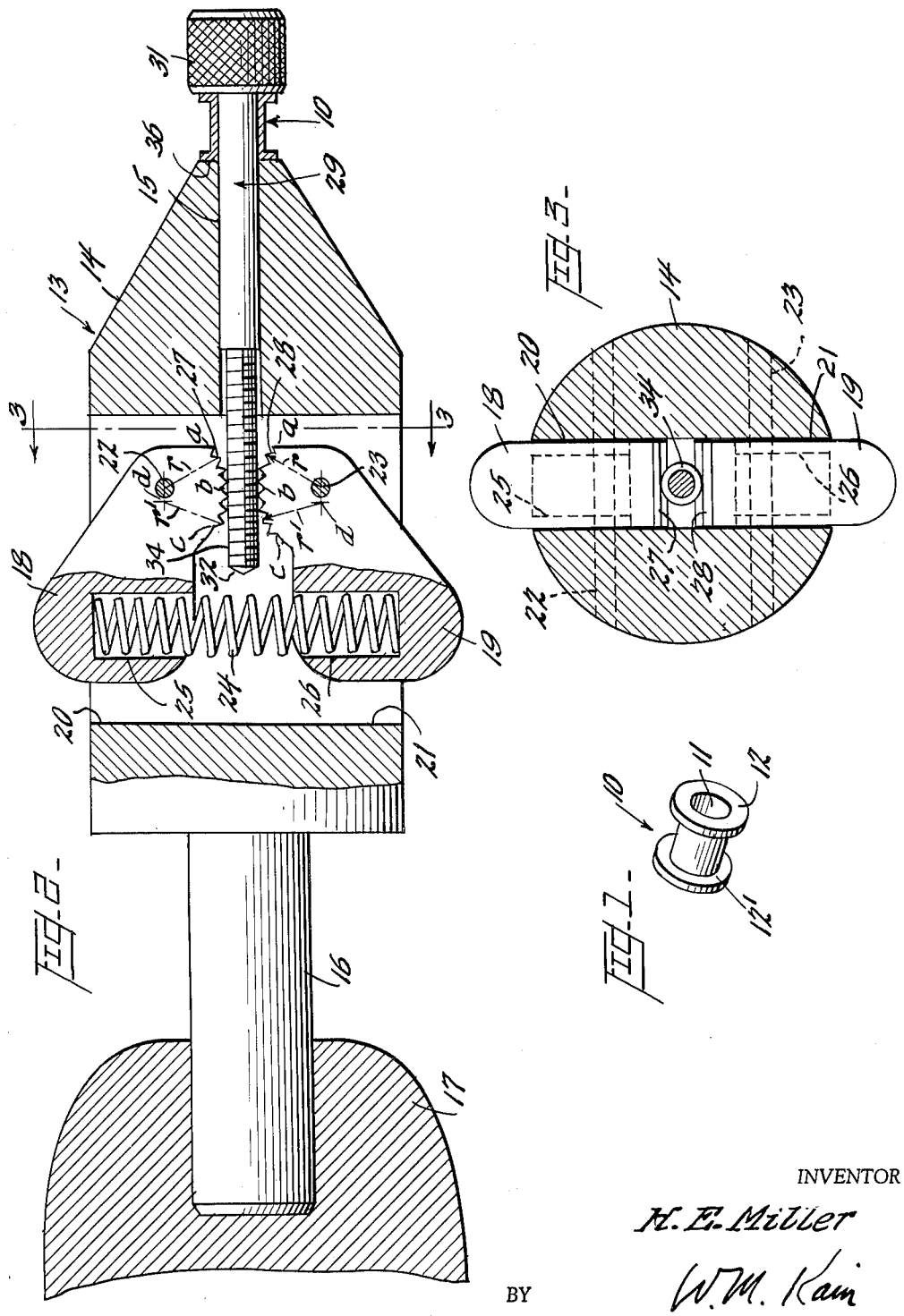
INVENTOR
H. E. Miller
BY W. M. Kain
ATTORNEY

United States Patent Office 3,252,667
Patented May 24, 1966

3,252,667
CENTRIFUGAL CHUCK
Harry E. Miller, Winston-Salem, N.C., assignor to Western Electric Company, Incorporated, New York, N.Y., a corporation of New York
Filed Dec. 23, 1963, Ser. No. 332,500
6 Claims. (Cl. 242—46.2)

This invention relates to a centrifugal chuck and, more particularly, to such an apparatus that may be utilized to securely clutch an article without slippage prior to commencement of, and during, the rotation of the chuck.

In the winding of inductance devices such as coils, it is usually necessary that a specific number of turns of wire be placed on a spool. Therefore, any slippage of the spool during reeling must be avoided. In the prior art it has been customary to initially secure a spool in a chuck by several hand operations comprising opening and closing of chuck jaws by means of a wrench. The instant device avoids these operations by providing spring biased levers which, when released by the operator, will draw an arbor, on which is mounted a spool, into the chuck to clutch the spool to prevent slippage. As the chuck is rotated, centrifugal force pivots the levers to provide further clutching force on the spool. Therefore, the instant device eliminates numerous manual operations previously required, and provides a chuck free of slippage at all speeds of operation.

It is an object of the present invention to provide a new and improved centrifugal chuck for holding articles such as spools on which wire is to be wound.

It is another object of the invention to provide a chuck which has facilities to draw an arbor axially within the chuck for holding an article securely in place on the arbor.

It is still a further object of the invention to provide a quick release chuck for allowing a rapid change of articles in the chuck.

It is another object of the invention to provide a chuck for holding a spool without slippage by clutching action during a reeling operation so that an exact number of turns of wire may be wound thereon.

With these and other objects in mind, the present invention contemplates a centrifugal chuck having quick acting facilities for holding a tubular article such as a spool in place prior to initiation of rotation. An arbor on which the article is mounted may be drawn into an axial bore in the chuck by a spring biased mechanism. This provides a clutching action between the arbor, the article, and the chuck to hold the article against slippage. Rotation of the chuck swings a pivoted mechanism outwardly by centrifugal force to urge the arbor further into the bore. This provides additional clutching action on the article.

Other objects and advantages of the invention will become apparent upon consideration of the following detailed description in conjunction with the accompanying drawings, in which:

FIG. 1 is a perspective view of an article, such as a spool, which may be securely held during the reeling operation by the apparatus of the present invention;

FIG. 2 is a partially cut away side elevation of a chuck having a pair of spring biased levers with gear segments which engage a threaded arbor and embodying the principles of the present invention; and FIG. 3 is a sectional view taken on line 3—3 of FIG. 2 showing the levers pivotally mounted in radial slots in the chuck housing.

In FIG. 1 there is shown a spool 10 having a central bore 11 therethrough and a pair of flanges 12 and 12'. Wire is wound on spools of this type while the spool is held and rotated by the apparatus comprising the instant invention. It is to be understood that this spool is set forth as an example and that other articles may be held and rotated by this apparatus. For example, a pipe may be held during a turning operation by the instant apparatus.

In FIG. 2 there is shown a centrifugal chuck 13 comprising a housing 14 having a longitudinal bore 15 therethrough and a winding spindle 16 suitable for mounting in a winding head 17. Chuck 13 is further provided with a pair of levers 18 and 19 which are pivotally mounted in radial slots 20 and 21 on transverse studs 22 and 23. Levers 18 and 19 are normally biased apart by a compression spring 24 which is received in bores 25 and 26 in the levers.

Levers 18 and 19 are further provided with opposed segment gears or serrations 27 and 28, respectively. Gear segment 27 is formed in a smooth, continuous curve defined by two intersecting arcs $ab$ and $bc$. Arc $ab$ is traced by a radius $r$ swinging about the center of stud 22. Arc $bc$ is traced by a second radius $r'$ swinging about a point $d$ which is displaced to the left of stud 22. Gear segment 28 is complementary to gear segment 27 and is formed in a similar manner.

An arbor 29 includes an enlarged head 31 and a stem 32 which is received within bore 15 of the chuck 13. Stem 32 is provided with threads or serrations 34 which may be either of the usual continuous helical rib type, or individual separate ribs, as shown. Threads 34 are compatible with and normally engage the gear segments 27 and 28 for rack and pinion type action. In the alternative, levers 18 and 19 and stem 32 may be provided with cooperating frictional surfaces instead of gears 27 and 28, and threads 34. The frictional surfaces may consist of a roughened area, a rubber portion or any other well known device for increasing the friction between two engaging surfaces.

A spool 10 is mounted on the arbor 29 and is held by clutching action between a face 36 of housing 14 and the head 31 of the arbor 29.

In operation, an empty spool 10 is placed on stem 32 of arbor 29 in preparation for insertion of the arbor into bore 15. Levers 18 and 19 are manually urged together against the force of spring 24 to swing gear segments 27 and 28 apart. The arbor 29 in inserted into bore 15 until threads 34 are between the gear segments 27 and 28. The levers 18 and 19 are then released to pivot outwardly under the force of spring 24 permitting gear segments 27 and 28 to swing into engagement with threads 34 to draw the arbor 29 longitudinally into bore 15. The spool 10 is held securely in place between face 36 and head 31 by dual clutching action between flange 12' and face 36, and between flange 12 and head 31 to prevent any slippage of the spool during start up. If a continuous helical rib 34 is provided, head 31 may be turned manually prior to start up, threading the stem 32 between gears 27 and 28 to bring the clutching faces into even tighter engagement.

Chuck 13 is rotated by winding spindle 16 to urge levers 18 and 19 outwardly be centrifugal force. Gear segments 27 and 28 act on the threads 34 of stem 32 to draw the head 31 into still tighter engagement with the flanges 12 of spool 10. The combined action of the spring 24 and centrifugal forces provided by the levers 18 and 19 is sufficient to prevent slippage of the spool during all phases of start up, continued reeling, and stoppage of the reeling operation. This allows an exact number of turns of wire to be placed on spool 10.

Rapid removal of the arbor at the completion of a reeling operation is accomplished by squeezing levers 18 and 19 together to swing apart gear segments 27 and 28. As arcs $bc$ of gear segments 27 and 28 are offset slightly from the centers of studs 22 and 23, a more rapid disengagement of the segments from threaded stem 32 is effected. This action positively ejects the arbor 29 at least partially from the bore 15. The arbor is then withdrawn from the bore and another arbor with an empty spool inserted for a subsequent reeling operation.

It is to be understood that the above-described arrangements of apparatus and construction of elemental parts are simply illustrative of the application of the principles of the invention and many other modifications may be made without departing from the invention. For example, the chuck with only minor modifications may be used to hold nontubular articles.

What is claimed is:

1. An apparatus for holding a spool during a reeling operation which comprises:
    a housing having a longitudinal bore therein,
    an arbor having a head portion and a screw threaded end received in the bore for retaining a spool,
    a pair of levers pivotally mounted on oppositely spaced axes which are transverse to said longitudinal bore having gear segments in engagement with the screw threaded end of the arbor,
    biasing means for pivoting the levers outwardly to draw the arbor longitudinally into the housing and clutch the spool between the head and the housing, and
    means for rotating the housing at sufficient speed to centrifugally drive the levers outwardly and further urge the arbor into the housing.

2. An apparatus for holding a tubular article during a reeling operation, which comprises:
    a housing having a longitudinal bore and a pair of radial slots therein,
    a pair of centrifugal levers having opposed gear segments and pivotally mounted in the radial slots on axes which are oppositely spaced from and transverse to said longitudinal bore,
    an arbor for receiving a tubular article having a head and a screw threaded stem extending into the bore in meshed engagement with the gear segments,
    biasing means for pivoting the levers to axially draw the stem within the housing to hold the article between the head and the housing, and
    means for rotating the housing at sufficient speed to centrifugally pivot the levers and further urge the stem within the housing.

3. A centrifugal chuck for holding an article, which comprises:
    a rotary housing having an axial bore therein,
    a headed arbor slidably mounted in the axial bore for retaining an article,
    a pair of levers, each having first and second ends, mounted on the housing for pivotal movement about axes which are intermediate said first and second ends of said levers oppositely spaced and transverse to said axial bore to engage and draw the headed arbor into the housing to axially force the article against the housing,
    means engaging said first ends of said levers for urging said second ends of said levers toward each other to grip and draw said arbor into said housing, and
    means for rotating the housing at sufficient speed to centrifugally pivot the pair of levers and further draw the arbor into the housing.

4. An apparatus for holding a tubular article during a turning operation, which comprises:
    a rotary mounted cylindrical housing having a longitudinal slot extending therethrough and an axial bore running from said slot to a front end of said housing,
    a pair of levers, each having first and second ends, pivotally mounted in said housing on spaced axes which are intermediate said first and second ends of said levers and transverse to said axial bore for movement within said slots,
    said levers having aligned bores formed in first ends, thereof,
    said second ends of said levers having arcuate arrays of serrations formed thereon,
    a compression spring mounted in said bores for urging said levers to move said second ends and serrations thereof toward one another,
    an arbor for receiving a tubular article having a threaded end section positioned in said axial bore and between said serrations when said levers are pivoted by compression of said spring,
    a head on the opposite end of the arbor for turning said arbor to move said threaded section along said serrations to advance said head against a spool mounted on said arbor whereupon said spool is moved into contact with the front end of said housing,
    means of rotating the housing at sufficient speed to centrifugally pivot the levers and further urge the arbor within the housing.

5. A chuck for holding a tubular article, which comprises:
    a rotary housing having an axial bore therein,
    an arbor having a head and having a stem slidably mounted in the axial bore for holding the tubular article against the housing,
    a pair of levers each having first and second ends,
    means for pivotally mounting said levers on the housing on axes which are intermediate said first and second ends of said levers and are oppositely spaced and transverse to said axial bore,
    biasing means engaging said first ends of said levers for pivoting said second ends of said levers into engagement with the stem to draw the head against the article to retain the article, and
    means for rotating the housing at sufficient speed to further pivot the levers to draw the head against the article.

6. A centrifugal chuck for holding a tubular article which comprises:
    a rotary housing,
    a pair of levers pivotally mounted intermediate their ends on axes in said housing which are oppositely spaced and transverse to a longitudinal axis of said housing and having serrations formed on inner ends thereof,
    an arbor slidably mounted in said housing for retaining a tubular article, said arbor having its inner end screw threaded to engage the serrations on said levers,
    a head on the opposite end of the arbor for turning said arbor to move said threaded section along said serrations to advance said head against the tubular article mounted on said arbor whereupon said tubular article is initially gripped between said head of said arbor and said housing, and
    means for rotating said housing at sufficient speed to centrifugally pivot said inner ends of said levers toward said longitudinal axis of said housing and further urge the arbor within the housing.

References Cited by the Examiner
FOREIGN PATENTS
481,505  9/1916  France.

MERVIN STEIN, *Primary Examiner.*
STANLEY N. GILREATH, *Examiner.*